June 11, 1957 C. J. HIRSCH 2,795,656

REPEATER SYSTEM

Original Filed April 16, 1952

INVENTOR.
CHARLES J. HIRSCH

BY Laurence B. Dodds

ATTORNEY 2,795,656

REPEATER SYSTEM

Charles J. Hirsch, Douglaston, N. Y., assignor to Hazeltine Research, Inc., Chicago, Ill., a corporation of Illinois Continuation of abandoned application Serial No. 282,625, April 16, 1952. This application September 1, 1955, Serial No. 532,013

15 Claims. (Cl. 179—171)

GENERAL

The present invention, which is a continuation of abandoned application Serial No. 282,625, filed April 16, 1952, and entitled "Repeater System," is directed to repeater systems which are useful for various applications such as in control or servo systems and in electrocardiographs. Systems of the type under consideration have particular utility as amplifier systems capable of producing an amplification which may be less than or greater than unity. Accordingly, the invention will be described in the environment of an amplifier system.

The so-called direct-current amplifier is capable of amplifying unidirectional potentials and alternating potentials of very low frequency or alternating potentials having a unidirectional component. Difficulties are experienced with such amplifiers in that the operation thereof is disturbed by changes or slow drifts in the anode current of the amplifier tube or tubes resulting from variations in the values of the energizing potentials unless special precautions are taken to compensate for such variations. Balanced systems including pairs of amplifier tubes having substantially identical electrical characteristics, auxiliary circuits for compensating for slight differences in the characteristics of the tubes, negative feed-back circuits, and voltage-regulating power-supply systems are some of the expedients employed to effect stabilization in direct-current amplifiers. As a result, such amplifiers are often quite complex and for some applications, such as in electrocardiographs, the drift in gain of the amplifiers is greater than may be desired.

It is an object of the present invention, therefore, to provide a new and improved repeater system which avoids one or more of the above-mentioned disadvantages of prior repeater or amplifier systems.

It is another object of the invention to provide a new and improved repeater or translating system having a relatively high stability and which is capable of translating both unidirectional potentials of variable magnitude and low-frequency alternating potentials.

It is a further object of the invention to provide a new and improved wide band repeater system.

It is an additional object of the invention to provide a new and improved repeater system capable of producing a relatively high gain.

In accordance with a particular form of the invention, a translating system comprises means for supplying a first effect having an instantaneous value which varies over a predetermined range of magnitudes, and means for supplying a periodic second effect having an amplitude greater than the aforesaid magnitude range and a frequency greater than components of the above-mentioned first effect to be repeated. The translating system also includes means for supplying a third effect and comparison means responsive to the first and second effects for developing control pulses when those effects have substantially equal instantaneous values and the aforesaid second effect is swinging in a predetermined direction. The system additionally includes a means having a nonlinear translating characteristic coupled to the third-mentioned means and responsive to the control pulses for deriving samples of the aforesaid third effect representative of the instantaneous value thereof. The translating system also includes a modifier coupled to the last-mentioned means and including means proportioned to attenuate the third effect and to derive from the samples an effect representative of at least the first effect.

For a better understanding of the present invention, together with other and further objects thereof, reference is had to the following description taken in connection with the accompanying drawing, and its scope will be pointed out in the appended claims.

Referring now to the drawing.

Figure 1:
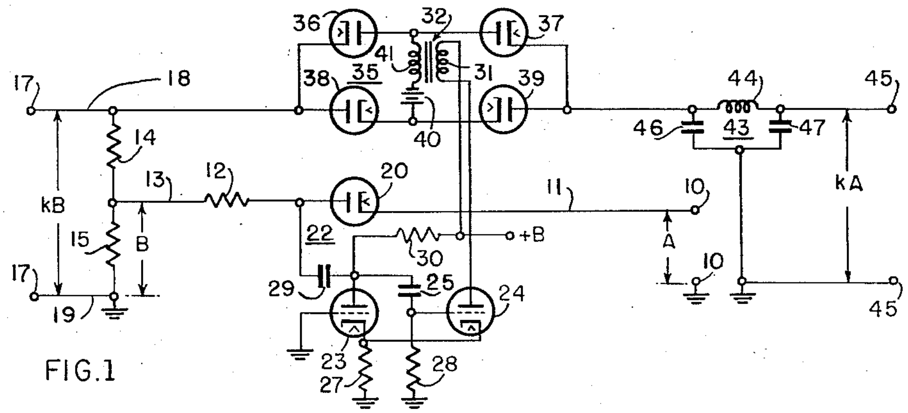
Fig. 1 is a circuit diagram of a repeater system in accordance with a particular form of the present invention.

*Description of repeater system of Fig. 1*

Figure 2:
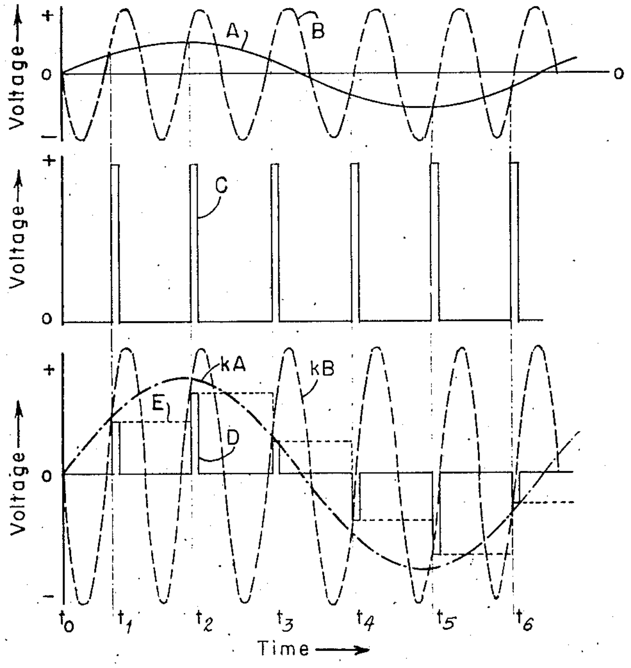
Fig. 2 is a graph which is useful in explaining the operation of the repeater system of Fig. 1.

Referring now to Figs. 1 and 2 of the drawing, the repeater system there represented comprises a voltage-amplifier system including a circuit having a pair of input terminals 10, 10 and an electrical conductor 11 for supplying for amplification by a factor $k$ a first signal designated A having an instantaneous value which varies over a predetermined range of magnitudes. The first signal may be a pulsating unidirectional voltage or may be a suitable alternating voltage such as that represented by curve A of Fig. 2 of the drawing. The Fig. 1 repeater system also includes a circuit for supplying a periodic second signal having an amplitude greater than the aforesaid magnitude range of the first signal A and also having a frequency greater than frequency components of the first signal to be repeated. The frequency of the second signal is preferably at least twice as high as frequency components of the first signal to be repeated. For example, if the first signal A is a 1000 cycle sine wave, the frequency of the second signal preferably is at least 2000 cycles. The circuit for supplying the second signal includes a resistor 12, an electrical conductor 13, and a resistor 15 which comprises a portion of a voltage divider including series-connected resistors 14 and 15. The second signal may be an alternating voltage of the sine-wave type represented by curve B of Fig. 2 although other periodic voltages such as a saw-tooth wave having the amplitude and frequency characteristic just mentioned may be employed.

The repeater system of Fig. 1 further includes a circuit having circuit elements proportioned to supply a third signal having an instantaneous value which may vary at a rate different from that of the aforesaid second signal. In particular the third signal may be a periodic signal having an amplitude $k$ times that of the second signal B and a frequency related to that of the second signal, the constant $k$ being substantially equal to the amplification factor mentioned in the preceding paragraph. This circuit comprises a pair of input terminals 17, 17, electrical conductors 18 and 19, and the voltage divider 14, 15 which is effective to develop across the divider a periodic voltage such as that represented by curve $k$B of Fig. 2. The frequency and the maximum amplitude of this third signal bear a fixed relationship to the corresponding paramaters of the second signal B and in the embodiment represented the third signal is both integrally related to and synchronized with the second signal since the voltage B is derived from and constitutes a portion of the voltage $k$B as established by the resistances afforded by the resistors 14 and 15 and the current flowing therein.

The repeater system also includes a comparison circuit responsive to the first and the second signals A and B, respectively, for developing control pulses when those signals have substantially equal instantaneous values and the aforesaid second signal is swinging in a predetermined or positive direction. This comparison circuit includes a unidirectionally conductive device such as a diode 20 having its anode connected to one terminal of the resistor 12 and its cathode connected through the conductor 11 to the ungrounded one of the input terminals 10, 10. The comparison circuit further includes a pulse generator which may comprise a relaxation oscillator such as a conventional univibrator 22 of the cathode-coupled type having its elements so proportioned that it normally has a stable operating condition but may be triggered to its unstable condition for momentary operation thereat by a suitable control effect. This univibrator includes a pair of electron-discharge devices comprising triodes 23 and 24, the anode of the former and the control electrode of the latter being cross coupled through a condenser 25 and the cathodes of the tubes being connected to ground through a resistor 27. The control electrode of the tube 23 is connected directly to ground and the control electrode of the tube 24 is connected to ground through a grid-leak resistor 28. The anode of the tube 23 is connected to the anode of the diode 20 through a coupling condenser 29 and is also connected to a source of potential +B through a load resistor 30 while the anode of the tube 24 is connected to that source through the primary winding 31 of a transformer 32. The parameters of the univibrator 22 are such that the tube 24 is normally conductive and the tube 23 is normally biased to cutoff by the positive potential developed at the cathodes of the tubes. The resistor 30 and the condenser 29 may be proportioned to differentiate a signal applied to the univibrator from the anode of the diode 20 and the time constant of the resistor-condenser network 28, 25 is such that a very short duration output pulse is developed in the anode circuit of the tube 24 in response to a signal applied to the control electrode thereof.

The repeater system further includes a signal-translating channel having a nonlinear translating characteristic coupled to the described comparison circuit for translating for the duration of the aforesaid output pulse a signal related to the third signal *k*B. This signal-translating channel comprises a normally open switching circuit 35 containing a pair of parallel branches. One branch includes a pair of unidirectionally conductive devices such as diodes 36 and 37, the cathode of the diode 36 being connected to the junction of a terminal 17 and the resistor 14, and its anode being connected to the anode of the diode 37. The other branch includes a pair of diodes 38 and 39 having interconnected cathodes, the anode of the diode 38 being connected to the junction of the terminal 17 and the resistor 14, and the anode of the diode 39 being connected to the cathode of the diode 37. The positive terminal of a biasing battery 40 is connected to the cathodes of the diodes 38 and 39 and its negative terminal is connected through the secondary winding 41 of the transformer 32 to the anodes of the diodes 36 and 37 to maintain the four diodes in a normally nonconductive condition.

The repeater system additionally includes a signal modifier coupled to the signal-translating channel or switching circuit 35 and has circuit elements proportioned to attenuate the third signal *k*B and to derive from the signal translated by channel 35 a signal *k*A representative of at least the first signal A. This signal modifier preferably comprises a low-pass filter network 43 including an inductor 44 connected in series between the anode of the tube 39 and the ungrounded one of a pair of output terminals 45, 45. Condensers 46 and 47 are connected between the respective terminals of the inductor 44 and the other output terminal 45. The filter network 43 preferably has a cutoff frequency between the highest frequency component to be repeated of the first signal A and the frequency of the third signal *k*B to attenuate at least the third signal and to derive the output signal *k*A. For example, if the highest frequency component to be repeated of the first signal A is 1000 cycles and the frequency of the third signal *k*B is 2000 cycles, the cutoff frequency of the filter network 43 is between 1000 and 2000 cycles.

*Explanation of operation of repeater system of Fig. 1*

Considering now the operation of the repeater system just described, and referring to the curves of Fig. 2, the first signal A which varies in the manner represented by curve A is applied to the terminals 10, 10 for translation by the conductor 11 to the cathode of the diode 20. The third signal *k*B represented in Fig. 2 is also applied to the terminals 17, 17 to develop across the resistor 15 for translation by the conductor 13 and the resistor 12 to the anode of the diode 20 the signal B represented by the cuve B. The wave form of this signal, as previously mentioned, is similar to that of the signal *k*B applied to the terminals of the voltage divider 14, 15 but has lower amplitude. When the second signal applied to the anode of the diode 20 has a predetermined relationship with reference to the signal applied to the cathode thereof, that is, when the signal of curve B of Fig. 2 swings in a predetermined or positive direction and the instantaneous value thereof just begins to exceed that of the signal of curve A, the diode 20 is rendered conductive thereby causing a current flow in the resistor 12 which, in turn, reduces the potential at the anode of the diode. The positive swing of the voltage wave of curve B begins to exceed the voltage wave of curve A at the several instants $t_1$, $t_2$, $t_3$, $t_4$, $t_5$ and $t_6$ as represented in Fig. 2. The reduction in the anode potential of the diode 20 at each of these instants develops a negative pulse which is applied to the condenser 29 for translation to the univibrator 22. The negative pulses occurring at the times just mentioned are differentiated by the well-known action of the condenser 29 and the resistor 30 to derive short-duration pulses for application through the condenser 25 to the control electrode of the tube 24.

As previously mentioned, the tube 24 is normally conductive and the tube 23 is normally biased to anode-current cutoff. The short-duration pulses of negative polarity applied to the control electrode of tube 24 at an instant, such as the time $t_1$, are effective to drive that tube to anode-current cutoff and the reduced current flow in the resistor 27 reduces the control electrode-cathode bias of tube 23 so that it becomes conductive. The univibrator 22 remains in its unstable operating condition with the tube 24 non-conductive and the tube 23 conductive for a very brief interval of time determined primarily by the time constant of the resistor 28 and the condenser 25 in the control electrode-cathode circuit of the tube 24. At the end of this short interval the univibrator returns to its stable operating condition until the arrival of another negative pulse on the control electrode of the tube 24. During the interval in which the tube 24 is rendered nonconductive, the anode thereof becomes more positive beginning at the time $t_1$ and the transformer 32 develops across the secondary winding 41 at time $t_1$ a short-duration positive pulse of the type represented by curve C of Fig. 2 for application to the anodes of the diodes 36 and 37. Similar action occurs at times $t_2$, $t_3$, $t_4$, $t_5$ and $t_6$.

The short-duration pulses occurring at the times just mentioned are effective to overcome the bias applied by the battery 40 to the diodes of the switching system 35 thereby rendering those tubes momentarily conductive so that a signal-translating path is completed between the terminals 17, 17 and the input terminals of the filter network 43. After the termination of individual ones of the control pulses of curve C, the switching system 35 is rendered nonconductive by the action of the battery 40 and the circuit between the terminals 17, 17 and the input terminals of the filter network 43 is effectively interrupted. The described momentary closings of the switching system 35 are effective to translate through that system to the input terminals of the filter network 43 a signal related to the third voltage $kB$. The translated signal comprises a series of short-duration pulses of the type represented by curve D of Fig. 2 and the larger amplitude pulses have amplitudes which exceed the maximum amplitude of the first signal represented by curve A. It will be observed that the pulses of curve D occurring at times $t_1$, $t_2$ and $t_3$ are of positive polarity whereas those occurring at times $t_4$, $t_5$, and $t_6$ are of negative polarity. This results since the first signal represented by curve A undergoes positive and negative alternations and the second signal represented by curve B includes higher frequency alternations which swing in a positive sense with reference to both the positive and the negative alternations of curve A.

It will be seen from Fig. 2 that the pulses of curve D occurring at the instants $t_1$, $t_2$, $t_3$, $t_4$, $t_5$ and $t_6$ effectively comprise samples of the voltage represented by curve $kB$ at those instants. To facilitate the understanding of the action of the signal modifier or filter network 43, its action will initially be considered as though it consisted only of the condenser 46. The condenser 46 stores the voltage supplied thereto through the switching system 35 at the time $t_1$ from the terminals 17, 17 and maintains that voltage, as represented by the dotted line curve E, until the next sampling interval $t_2$. Since at time $t_2$ the voltage sample applied to the condenser 46 through the switching system 35 is greater than at time $t_1$, the voltage level across the condenser increases and remains at the new level until time $t_3$. At time $t_3$, however, the voltage sample translated by the switching system 35 for application to the condenser 46 is less than at time $t_2$. Consequently energy flows from the condenser 46 at time $t_3$ through the switching system 35 and the circuits associated with the terminals 17, 17 and the voltage which remains across the condenser shortly after the time $t_3$ is at a considerably lower level than at time $t_2$ and is maintained at that level until the time $t_4$. At time $t_4$ the switching system 35 is effective to apply to the condenser a pulse sample of negative polarity and the voltage of the condenser changes in the manner previously explained but in the negative sense as represented by curve E. The voltage impressed across the condenser 46 at time $t_4$ remains at the same level until time $t_5$ when the applied voltage then becomes more negative as represented and remains at this new level until time $t_6$. At time $t_6$ the pulse sample of curve D is less negative and the voltage across the condenser assumes a less negative value as represented by curve E.

Considering now the over-all action of the complete filter network 43, this network utilizes the pulses of curve D translated by the switching system 35 at the times $t_1$, $t_2$, $t_3$, etc. and, by the well-known action of a low-pass filter which attenuates high-frequency components, converts these pulses to the voltage wave represented by curve $kA$ of Fig. 2, which voltage effectively constitutes an amplified replica of the first voltage represented by curve A. The amplification afforded is determined essentially by the impedance relationship of the series combination of the resistors 14 and 15 with reference to that of the resistor 15.

When a repeater system of the type represented in Fig. 1 is to be employed as a wide band amplifier, it is preferable that the frequency of the voltages $kB$ and B be large with reference to the frequency of the voltage A in order that the sampling frequency be high to develop an output voltage $kA$ across the terminals 45, 45 accurately representative of the applied voltage A. It is usually preferable that the frequency of the voltages A and $kB$ be sufficiently different so that the filter network 43 can be of relatively inexpensive construction for attenuating the high-frequency components of the samples of the third signal translated by the switching device 35. While the frequency and phase relationships of the voltages B and $kB$ have been considered as the same in explaining the operation of the Fig. 1 repeater system, they may have quite different relationships. For example, one of the voltages may be a harmonic of the other but in any event it is important that the frequencies of the voltages B and $kB$ be at least twice that of the highest voltage A to be translated.

Figure 3:
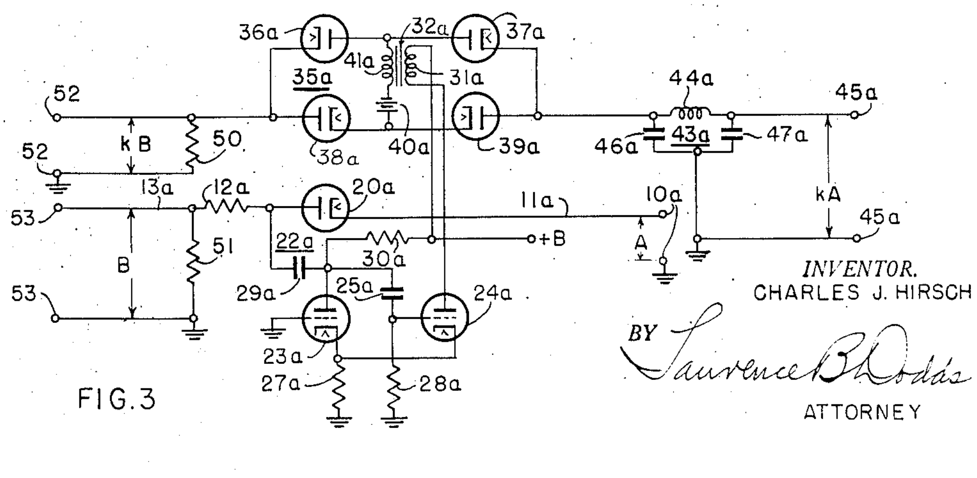
Fig. 3 is a circuit diagram of a repeater system embodying the present invention in a modified form.

*Description of repeater system of Fig. 3*

Fig. 3 is a circuit diagram representative of a modified form of a repeater system in accordance with the present invention which is essentially the same as that represented in Fig. 1. Accordingly, corresponding elements are designated by the same reference numerals with the suffix "*a*." The repeater system of Fig. 3 differs from that of Fig. 1 only in the form of the input circuits for the voltages B and $kB$. A resistor 50 connected across a pair of input terminals 52, 52 supplies the voltage $kB$ to the switching system 35*a*. A resistor 51 connected across a pair of input terminals 53, 53 is utilized to apply the voltage B to the anode of the diode 20*a* of the comparison circuit. By employing input circuits of the type just described, the voltages B and $kB$ need not have frequencies which are integrally related and in synchronous relation with each other. Likewise, it is permissible that the voltage $kB$ be smaller than the voltage B so that the repeater system functions as an amplifier system affording a gain of less than unity to develop an output signal $kA$ having an amplitude less than that of the input signal applied to the terminals 10*a*, 10*a*. The operation of the repeater system of Fig. 3 is essentially the same as that explained in connection with the Fig. 1 embodiment and will not be repeated.

From the foregoing description it will be seen that a repeater system in accordance with the present invention is capable of producing a relatively high gain, has particular utility in a low-frequency amplifier, and may also be employed as a wide band repeater.

While there have been described what are at present considered to be the preferred embodiments of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. A repeater system comprising: a circuit for supplying a first signal having an instantaneous value which varies over a predetermined range of magnitudes; a circuit for supplying a periodic second signal having an amplitude greater than said magnitude range and a frequency greater than components of said first signal to be repeated; a circuit for supplying a periodic third signal having a frequency related to that of said second signal; a comparison circuit responsive to said first and second signals for developing control pulses when said signals have substantially equal instantaneous values as said second signal is swinging in a predetermined direction; a signal-translating channel having a nonlinear translating characteristic coupled to said comparison circuit and said third-mentioned circuit and responsive to said control pulses for deriving samples of said third signal representative of the instantaneous value thereof; and a signal modifier coupled to said channel and including circuit elements proportioned to attenuate said third signal and to derive from said samples a signal representative of at least said first signal.

2. A repeater system comprising: a circuit for supplying a first signal having an instantaneous value which varies over a predetermined range of magnitudes; a circuit for supplying a periodic second signal having an amplitude greater than said magnitude range and a frequency greater than components of said first signal to be repeated; a circuit for supplying a periodic third signal having a frequency integrally related to that of said second signal and synchronized therewith; a comparison circuit responsive to said first and second signals for developing control pulses when said signals have substantially equal instantaneous values as said second signal is swinging in a predetermined direction; a signal-translating channel having a nonlinear translating characteristic coupled to said comparison circuit and said third-mentioned circuit and responsive to said control pulses for deriving samples of said third signal representative of the instantaneous value thereof; and a signal modifier coupled to said channel and including circuit elements proportioned to attenuate said third signal and to derive from said samples a signal representative of at least said first signal.

3. A repeater system comprising: a circuit for supplying a first signal having an instantaneous value which varies over a predetermined range of magnitudes; a circuit for supplying a periodic second signal having an amplitude greater than said magnitude range and a frequency at least twice as great as components of said first signal to be repeated; a circuit for supplying a periodic third signal having a frequency related to that of said second signal; a comparison circuit responsive to said first and second signals for developing control pulses when said signals have substantially equal instantaneous values as said second signal is swinging in a positive direction; a signal-translating channel having a nonlinear translating characteristic coupled to said comparison circuit and said third-mentioned circuit and responsive to said control pulses for deriving samples of said third signal representative of the instantaneous value thereof; and a signal modifier coupled to said channel and including circuit elements proportioned to attenuate said third signal and to derive from said samples a signal representative of at least said first signal.

4. A repeater system comprising: a circuit for supplying a first signal having an instantaneous value which varies over a predetermined range of magnitudes; a circuit for supplying a periodic second signal having an amplitude greater than said magnitude range and a frequency greater than components of said first signal to be repeated; a circuit for supplying a periodic third signal having a frequency integrally related to that of said second signal and synchronized therewith; a comparison circuit responsive to said first and second signals for developing control pulses when said signals have substantially equal instantaneous values as said second signal is swinging in a positive direction; a signal-translating channel having a nonlinear translating characteristic coupled to said comparison circuit and said third-mentioned circuit and responsive to said control pulses for deriving samples of said third signal representative of the instantaneous value thereof; and a signal modifier coupled to said channel and including circuit elements proportioned to attenuate said third signal and to derive from said samples a signal representative of and having an amplitude greater than that of said first signal.

5. A repeater system comprising: a circuit for supplying a first signal having an instantaneous value which varies over a predetermined range of magnitudes; a circuit including an impedance for supplying a periodic second signal having an amplitude greater than said magnitude range and a frequency greater than components of said first signal to be repeated; a circuit including said impedance for supplying a periodic third signal having a frequency equal to and an amplitude greater than that of said second signal and synchronized therewith; a comparison circuit responsive to said first and second signals for developing control pulses when said signals have substantially equal instantaneous values as said second signal is swinging in a predetermined direction; a signal-translating channel having a nonlinear translating characteristic coupled to said comparison circuit and said third-mentioned circuit and responsive to said control pulses for deriving samples of said third signal representative of the instantaneous value thereof; and a signal modifier coupled to said channel and including circuit elements proportioned to attenuate said third signal and to derive from said samples a signal representative of and having an amplitude greater than that of said first signal.

6. A repeater system comprising: a circuit for supplying a first signal having an instantaneous value which varies over a predetermined range of magnitudes; a circuit for supplying a periodic second signal having an amplitude greater than said magnitude range and a frequency greater than components of said first signal to be repeated; a circuit for supplying a periodic third signal having a frequency related to that of said second signal; a comparison circuit responsive to said first and second signals for developing control pulses when said signals have substantially equal instantaneous values as said second signal is swinging in a predetermined direction; a signal-translating channel having a nonlinear translating characteristic coupled to said comparison circuit and said third-mentioned circuit and responsive to said control pulses for deriving samples of said third signal representative of the instantaneous value thereof; and a filter network coupled to said channel and including circuit elements proportioned to attenuate said third signal and to derive from said samples a signal representative of said first signal.

7. A repeater system comprising: a circuit for supplying a first signal having an instantaneous value which varies over a predetermined range of magnitudes; a circuit for supplying a periodic second signal having an amplitude greater than said magnitude range and a frequency at least twice as great as components of said first signal to be repeated; a circuit for supplying a periodic third signal having a frequency integrally related to that of said second signal and synchronized therewith; a comparison circuit responsive to said first and second signals for developing control pulses when said signals have substantially equal instantaneous values as said second signal is swinging in a positive direction; a signal-translating channel having a nonlinear translating characteristic coupled to said comparison circuit and said third-mentioned circuit and responsive to said control pulses for deriving samples of said third signal representative of the instantaneous value thereof; and a low-pass filter network having a cutoff frequency between the highest frequency component of said first signal to be repeated and said frequency of said third signal for deriving from said samples a signal representative of said first signal.

8. A repeater system comprising: a circuit for supplying a first signal having an instantaneous value which varies over a predetermined range of magnitudes; a circuit for supplying a periodic second signal having an amplitude greater than said magnitude range and a frequency greater than components of said first signal to be repeated; a circuit for supplying a periodic third signal having a frequency related to that of said second signal; a comparison circuit responsive to said first and second signals for developing control pulses when said signals have substantially equal instantaneous values as said second signal is swinging in a positive direction; a switching circuit coupled to said comparison circuit and said third-mentioned circuit and responsive to said control pulses for deriving samples of said third signal individually having durations equal to the durations of individual ones of said control pulses; and a signal modifier coupled to said channel and including circuit elements proportioned to attenuate said third signal and to derive from said samples a signal representative of at least said first signal.

9. A repeater system comprising: a circuit for supplying a first signal having an instantaneous value which varies over a predetermined range of magnitudes; a circuit for supplying a periodic second signal having an amplitude greater than said magnitude range and a frequency greater than components of said first signal to be repeated; a circuit for supplying a periodic third signal having a frequency related to that of said second signal; a comparison circuit responsive to said first and second signals for developing control pulses when said signals have substantially equal instantaneous values as said second signal is swinging in a predetermined direction; a normally open electron-discharge switching circuit coupled to said comparison circuit and closed by individual ones of said control pulses for the duration of individual ones thereof for deriving samples of said third signal representative of the instantaneous value thereof; and a signal modifier coupled to said channel and including circuit elements proportioned to attenuate said third signal and to derive from said samples a signal representative of said first signal.

10. A repeater system comprising: a circuit for supplying a first signal having an instantaneous value which varies over a predetermined range of magnitudes; a circuit for supplying a periodic second signal having an amplitude greater than said magnitude range and a frequency greater than components of said first signal to be repeated; a circuit for supplying a periodic third signal having a frequency integrally related to that of said second signal and synchronized therewith; a comparison circuit including a unidirectionally conductive device responsive to said first and second signals for developing a control effect when said signals have substantially equal instantaneous values as said second signal is swinging in a predetermined direction and including a pulse generator responsive to said control effect for developing therefrom short-duration control pulses; a signal-translating channel having a nonlinear translating characteristic coupled to said pulse generator and said third-mentioned circuit and responsive to said control pulses for deriving samples of said third signal representative of the instantaneous value thereof; and a signal modifier coupled to said channel and including circuit elements proportioned to attenuate said third signal and to derive from said samples a signal representative of at least said first signal.

11. A repeater system comprising: a circuit for supplying for amplification by substantially a factor $k$ a first signal having an instantaneous value which varies over a predetermined range of magnitudes; a circuit for supplying a periodic second signal having an amplitude greater than said magnitude range and a frequency greater than components of said first signal to be amplified; a circuit having circuit elements proportioned to supply a periodic third signal having an amplitude $k$ times that of said second signal and a frequency integrally related to that of said second signal and synchronized therewith; a comparison circuit responsive to said first and second signals for developing control pulses when said signals have substantially equal instantaneous values as said second signal is swinging in a predetermined direction; a signal-translating channel having a nonlinear translating characteristic coupled to said comparison circuit and responsive to said control pulses for deriving samples of said third signal representative of the instantaneous value thereof; and a signal modifier coupled to said channel and including circuit elements proportioned to attenuate said third signal and to derive from said samples a signal representative of and having an amplitude substantially $k$ times that of said first signal.

12. A repeater system comprising: a circuit for supplying a first signal having an instantaneous value which varies over a predetermined range of magnitudes; a voltage divider including first and second portions; a circuit including said first portion for supplying a periodic second signal having an amplitude greater than said magnitude range and a frequency greater than components of said first signal to be repeated; a circuit including said first and second portions for supplying a periodic third signal having a frequency integrally related to and an amplitude greater than that of said second signal and synchronized therewith; a comparison circuit responsive to said first and second signals for developing control pulses when said signals have substantially equal instantaneous values as said second signal is swinging in a positive direction; a signal-translating channel having a nonlinear translating characteristic coupled to said comparison circuit and said third-mentioned circuit responsive to said control pulses for deriving samples of said third signal representative of the instantaneous value thereof; and a signal modifier coupled to said channel and including circuit elements proportioned to attenuate said third signal and to derive from said samples a signal representative of at least said first signal.

13. A repeater system comprising: a circuit for supplying a first signal having an instantaneous value which varies over a predetermined range of magnitudes; a circuit for supplying a periodic second signal having an amplitude greater than said magnitude range and a frequency greater than components of said first signal to be repeated; a circuit for supplying a third signal having a frequency related to that of said second signal and an instantaneous value which may vary at a rate different from that of said second signal; a comparison circuit responsive to said first and second signals for developing control pulses when said signals have substantially equal instantaneous values as said second signal is swinging in a predetermined direction; a signal-translating channel having a nonlinear translating characteristic coupled to said comparison circuit and said third-mentioned circuit responsive to said control pulses for deriving samples of said third signal representative of the instantaneous value thereof; and a signal modifier coupled to said channel and including circuit elements proportioned to attenuate said third signal and to derive from said samples a signal representative of at least said first signal.

14. A signal-translating system comprising: a circuit for supplying a first signal having an instantaneous value which varies over a predetermined range of magnitudes; a circuit for supplying a periodic second signal having an amplitude greater than said magnitude range and a frequency greater than components of said first signal to be repeated; a circuit for supplying a third signal; a comparison circuit responsive to said first and second signals for developing control pulses when said signals have substantially equal instantaneous values as said second signal is swinging in a predetermined direction; a signal-translating channel having a nonlinear translating characteristic coupled to said third-mentioned circuit and responsive to said control pulses for deriving samples of said third signal representative of the instantaneous value thereof; and a signal modifier coupled to said channel and including circuit elements proportioned to attenuate said third signal and to derive from said samples a signal representative of at least said first signal.

15. A translating system comprising: means for supplying a first effect having an instantaneous value which varies over a predetermined range of magnitudes; means for supplying a period second effect having an amplitude greater than said magnitude range and a frequency greater than components of said first effect to be repeated; means for supplying a third effect; a comparison means responsive to said first and second effects for developing control pulses when said effects have substantially equal instantaneous values as said second effect is swinging in a predetermined direction; means having a nonlinear translating characteristic coupled to said third-mentioned means and responsive to said control pulses for deriving samples of said third effect representative of the instantaneous value thereof; and a modifier coupled to said last-mentioned means and including means proportioned to attenuate said third effect and to derive from said samples an effect representative of at least said first effect.

No references cited.